(12) United States Patent
Barkam et al.

(10) Patent No.: US 11,641,586 B2
(45) Date of Patent: May 2, 2023

(54) MOBILE DEVICE LOCATION DETERMINATION

(71) Applicant: Micron Technology, Inc., Boise, ID (US)

(72) Inventors: Swetha Barkam, Meridian, ID (US); Bhumika Chhabra, Boise, ID (US); Kathryn H. Russo, Boise, ID (US); Zhao Zhao, Boise, ID (US)

(73) Assignee: Micron Technology, Inc., Boise, ID (US)

( * ) Notice: Subject to any disclaimer, the term of this patent is extended or adjusted under 35 U.S.C. 154(b) by 269 days.

(21) Appl. No.: 17/064,670

(22) Filed: Oct. 7, 2020

(65) Prior Publication Data

US 2022/0109983 A1   Apr. 7, 2022

(51) Int. Cl.
| | | |
|---|---|---|
| *H04W 12/63* | (2021.01) | |
| *G06N 20/00* | (2019.01) | |
| *H04W 4/029* | (2018.01) | |
| *H04W 4/38* | (2018.01) | |

(52) U.S. Cl.
CPC ............ *H04W 12/63* (2021.01); *G06N 20/00* (2019.01); *H04W 4/029* (2018.02); *H04W 4/38* (2018.02)

(58) Field of Classification Search
None
See application file for complete search history.

(56) References Cited

U.S. PATENT DOCUMENTS

| | | | |
|---|---|---|---|
| 9,955,352 | B2 | 4/2018 | Mahaffey et al. |
| 10,747,868 | B2 | 8/2020 | Bock et al. |
| 10,771,975 | B2 | 9/2020 | Conrad et al. |
| 10,791,454 | B2 | 9/2020 | Berke et al. |
| 2009/0196510 | A1* | 8/2009 | Gokturk ................. G06F 16/50 382/305 |
| 2011/0070898 | A1* | 3/2011 | Sanjeev ................ H04L 67/125 455/456.2 |
| 2011/0141276 | A1* | 6/2011 | Borghei ............ H04M 3/42221 455/410 |
| 2017/0164204 | A1 | 6/2017 | Fitzgerald et al. |
| 2017/0171741 | A1 | 6/2017 | Hannon |
| 2017/0289333 | A1* | 10/2017 | Pai .......................... G06F 21/44 |
| 2018/0089409 | A1* | 3/2018 | Zhang ..................... G06F 21/31 |
| 2018/0115890 | A1 | 4/2018 | Lee et al. |
| 2019/0020676 | A1 | 1/2019 | Laughlin et al. |

\* cited by examiner

*Primary Examiner* — Atta Khan (74) *Attorney, Agent, or Firm* — Brooks, Cameron & Huebsch, PLLC (57) ABSTRACT

Methods and apparatuses associated with determining a location of a mobile device are described. Examples can include receiving, at a mobile device in response to a triggering event, signaling that indicates the mobile device is in an unauthorized location, in possession of an unauthorized user, or both. Examples can include prompting an input representative of authorized user verification and enabling one or more circuits or power supplies of the mobile device based at least in part on determining that a value of the input satisfies. In response and based at least in part on determining that the value of the input fails to satisfy the threshold, examples can include capturing environmental data and location data associated with the mobile device and communicating the environmental data and location data and a location determination to an authorized user. In some examples, a mobile device can be deactivated responsive to unconfirmed authorized verification.

20 Claims, 4 Drawing Sheets

MOBILE DEVICE LOCATION DETERMINATION

TECHNICAL FIELD

The present disclosure relates generally to apparatuses and methods associated with determining a location of a mobile device.

BACKGROUND

A computing device is a mechanical or electrical device that transmits or modifies energy to perform or assist in the performance of human tasks. Examples include thin clients, personal computers, printing devices, laptops, mobile devices, internet-of-things (IoT) enabled devices, and gaming consoles, among others. An IoT enabled device can refer to a device embedded with electronics, software, sensors, actuators, and/or network connectivity which enable such devices to connect to a network and/or exchange data. Examples of IoT enabled devices include mobile phones, smartphones, tablets, phablets, computing devices, implantable devices, vehicles, home appliances, smart home devices, monitoring devices, wearable devices, devices enabling intelligent shopping systems, among other cyber-physical systems.

A mobile device, as used herein, can include a portable computing device such as a smartphone, tablet, e-reader, smartwatch or other wearable device, laptop, camera, etc. A mobile device may include a camera or cameras, sensors, and security capability features such as biometric scanners (e.g., eye scanner, facial recognition, fingerprint scanner) and passcode requirements, among others.

DETAILED DESCRIPTION

Examples of the present disclosure include apparatuses and methods for determining a location of a mobile device. A number of examples of the present disclosure can include receiving, at a mobile device, a triggering event indicating the mobile device is in an unauthorized location, in possession of an unauthorized user, or both and prompting, via a display of the mobile device, authorized user verification. Such examples can include allowing use of the mobile device responsive to confirmed authorized verification. Responsive to unconfirmed authorized verification, examples can include capturing, at the mobile device via a sensor, environmental data associated with the mobile device, capturing, at the mobile device, location data associated with the mobile device, and communicating the captured environmental data and location data to an authorized user of the mobile device.

Other examples of the present disclosure can include a mobile device including a processing resource and a memory resource in communication with the processing resource and having instructions executable to receive a triggering event indicating the mobile device is in an unauthorized location, in possession of an unauthorized user, or both and prompt, via a display of the mobile device, authorized user verification. Use of the mobile device may be allowed responsive to confirmed authorized verification, allow use of the mobile device. In such examples, responsive to unconfirmed authorized verification, image data, temperature data, sound data, or a combination thereof associated with an environment of the mobile device can be captured at the mobile device via a sensor, as can location data associated with the mobile device.

In some examples, a machine learning model can be utilized to determine a location of the mobile device based on the captured image data, temperature data, sound data, or a combination thereof and the captured location data, the location of the mobile device can be communicated to the authorized user of the mobile device, the mobile device can be disabled.

Yet other examples of the present disclosure can include a mobile device including a plurality of sensors, a processing resource, and a memory resource communicatively coupled to the plurality of sensors, in communication with the processing resource, and having instructions executable to determine a triggering event indicating the mobile device is in an unauthorized location, in possession of an unauthorized user, or both, has occurred utilizing a first machine learning model based on received biometric data, password data, location pattern data, or a combination thereof. The instructions can be executable to prompt, via a display of the mobile device, authorized user verification, and responsive to confirmed authorized verification within a threshold period of time, allow use of the mobile device. "Communicatively coupled," as used herein, can include coupled via various wired and/or wireless connections between devices such that data can be transferred in various directions between the devices. The coupling may not be a direct connection, and in some examples can be an indirect connection.

In such examples, responsive to unconfirmed authorized verification or non-response within the threshold period of time, the instructions can be executable to capture, at the mobile device via a first sensor of the plurality of sensors, environmental data associated with the mobile device and capture, at the mobile device via a second sensor of the plurality of sensors, location data associated with the mobile device. The instructions can be further executable to utilize a second machine learning model to determine a location of the mobile device based on the captured environmental data and the captured location data, communicate the location of the mobile device to the authorized user of the mobile device, and disable the mobile device.

In the following detailed description of the present disclosure, reference is made to the accompanying drawings that form a part hereof, and in which is shown by way of illustration how one or more embodiments of the disclosure can be practiced. These embodiments are described in sufficient detail to enable those of ordinary skill in the art to practice the embodiments of this disclosure, and it is to be understood that other embodiments can be utilized and that process, electrical, and structural changes can be made without departing from the scope of the present disclosure.

As used herein, the singular forms "a," "an," and "the" can include both singular and plural referents, unless the context clearly dictates otherwise. In addition, "a number of," "at least one," and "one or more" (e.g., a number of memory devices) can refer to one or more memory devices, whereas a "plurality of" is intended to refer to more than one of such things. Furthermore, the words "can" and "may" are used throughout this application in a permissive sense (i.e., having the potential to, being able to), not in a mandatory sense (i.e., must). The term "include," and derivations thereof, means "including, but not limited to." The terms "coupled," and "coupling" mean to be directly or indirectly connected physically or for access to and movement (transmission) of commands and/or data, as appropriate to the context. The terms "data" and "data values" are used interchangeably herein and can have the same meaning, as appropriate to the context.

The figures herein follow a numbering convention in which the first digit or digits correspond to the figure number and the remaining digits identify an element or component in the figure. Similar elements or components between different figures can be identified by the use of similar digits. For instance, element "24" in FIG. 2 may be referenced as "224" in FIG. 2 and "324" in FIG. 3. Multiple analogous elements within one figure may be referenced with a reference numeral followed by a hyphen and another numeral or a letter. For example, 362-1 may reference element 62-1 in FIGS. 3 and 362-N may reference element 62-N, which can be analogous to element 62-1. Such analogous elements may be generally referenced without the hyphen and extra numeral or letter. For example, elements 362-1 and 362-N may be generally referenced as 362. As used herein, designators such as "N", particularly with respect to reference numerals in the drawings, indicate that a number of the particular feature so designation can be included. It is also to be understood that the terminology used herein is for the purpose of describing particular embodiments only and is not intended to be limiting.

As will be appreciated, elements shown in the various embodiments herein can be added, exchanged, and/or eliminated so as to provide a number of additional embodiments of the present disclosure. In addition, the proportion and/or the relative scale of the elements provided in the figures are intended to illustrate certain embodiments of the present disclosure and should not be taken in a limiting sense.

A user may desire to locate his or her mobile device because it was lost, stolen, misplaced, or mistakenly taken, among others. While some mobile devices include applications to locate or track the mobile device, such applications may be based solely on Global Positioning System (GPS) data and do not allow for increased location granularity. Examples of the present disclosure can utilize machine learning models (e.g., artificial intelligence (AI)) to determine triggering events to trigger (e.g., via an application) a determination of a location of the mobile device. For instance, a machine learning model can be used to determine location patterns associated with an authorized user are abnormal, and along with other triggering events (e.g., unauthorized biometric data or password data, etc.) can trigger locating of the mobile device. A machine learning model, in some examples, can be used to determine the location of the mobile device, for instance using environmental and location data captured at the mobile device while it is lost, stolen, misplaced, etc. The location can be communicated to the authorized user or other authorized party.

Figure 1:
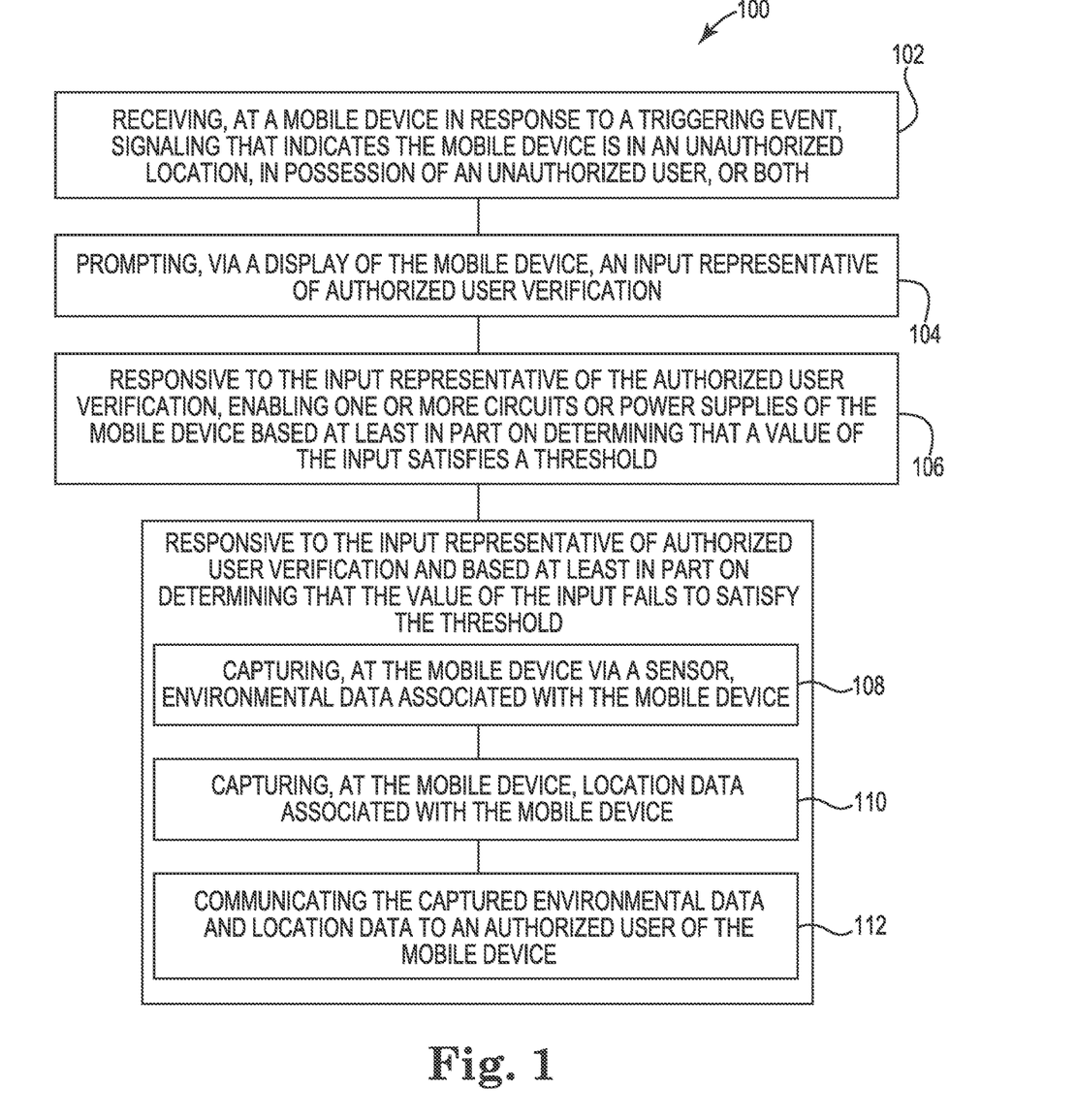
FIG. 1 is a flow diagram representing an example method for determining a location of a mobile device in accordance with a number of embodiments of the present disclosure.

FIG. 1 is a flow diagram representing an example method 100 for determining a location of a mobile device in accordance with a number of embodiments of the present disclosure. The method 100 can be performed by an apparatus such as the apparatuses 220 and 340 described with respect to FIGS. 2 and 3, respectively.

At 102, the method 100 can include receiving, at a mobile device in response to a triggering event, signaling that indicates the mobile device is in an unauthorized location, in possession of an unauthorized user, or both. A triggering event, as used herein, can include an event that triggers launching of an application to locate the mobile device prompting a user for authorization, or a combination thereof. For instance, if an authorized user loses his or her mobile device, the triggering event can include the mobile device (e.g., via the application) remotely receiving a notification from the authorized user that the mobile device is in the unauthorized location, in possession of the unauthorized user, or both. For example, the authorized user can log into an account linked to the mobile device via a computing device to request locating the mobile device.

As used herein, an authorized user includes a user with permission to access the mobile device. An authorized user can include a user possessing a passcode to access the mobile device and/or biometric authorization. For instance, an owner of a smartphone may be an authorized user and can use his or her fingerprints or facial recognition and/or a passcode to access his or her smartphone. The owner's spouse or other family member may also be an authorized user of the smartphone via biometric data or passcode knowledge. In some examples, an authorized user may name other authorized users to receive location information, but not access the mobile device (e.g., a brother can receive a text message regarding the location of the mobile device).

In some examples, the triggering event can include, for instance, unauthorized biometric data (e.g., fingerprints, facial patterns/recognition, retina scanning, voice patters/recognition, typing cadence, etc.), unauthorized password data (e.g., passcode data), abnormal location pattern data, or a combination thereof. Put another way, receiving the signaling in response to the triggering event can include receiving signaling representative of the aforementioned triggering events. For example, if an unauthorized user attempts to access the mobile device using his or her fingerprints or attempted passwords and fails, the application may be triggered to locate the mobile device.

In another example, if the mobile device is experiencing an abnormal location pattern, the application may be triggered to locate the mobile device. As used herein, a location pattern can include learned location patterns of the authorized user learned using machine learning models on the mobile device. For instance, a machine learning model can use data collected during an authorized user's daily routine to determine a location pattern of the mobile device. For instance, based on GPS data, Bluetooth data, mobile device tower data, Wi-Fi data, etc., the authorized user's location patterns including work locations and times, grocery stores, gas stations, normal travel (e.g., to relatives' homes), etc. can be learned.

The machine learning model can be trained and updated with new data as it is received. The machine learning model can be turned off or paused, for instance, if an authorized user travels frequently for work or is vacationing, among other reasons. An abnormal location pattern (and associated abnormal location pattern data) can include a location pattern that differs from the learned location pattern (e.g., different times, different locations, dramatic temperature differences, etc.).

The triggering event may be determined by an authorized user in some examples. For instance, the authorized user may desire two triggering events to occur before locating the mobile device. This can prevent triggering locating of the mobile device in response to a child playing with a parent's phone or an incorrect password (e.g., passcode) entry. For instance, an authorized user may choose to trigger locating the mobile device when unauthorized biometric data (e.g., fingerprints, facial recognition, etc.) and abnormal location pattern data are received, among other possible combinations. In another example, an authorized user may request a prompt to a wearable device or other computing device requesting permission to locate the mobile device. This prompt can occur in response to a triggering event such as receipt of abnormal location pattern data. Granting of permission, for instance, can be a triggering event. However, the authorized user may be on vacation and have the mobile device with him or her and can deny permission with respect to locating the mobile device.

At 104, the method 100 can include prompting, via a display of the mobile device, an input representative of authorized user verification and at 106, the method 100 can include enabling, responsive to the input representative of the authorized user verification, one or more circuits or power supplies of the mobile device based at least in part on determining that a value of the input satisfies a threshold. For example, in response to a triggering event such as received abnormal location pattern data, a mobile device (e.g., via a touchscreen display) may prompt a current user to provide a fingerprint or passcode as authorized user verification. If the user is able to successfully provide the requested data, which confirms the authorized verification (e.g., satisfactory threshold value), the user is allowed to use the mobile device (e.g., circuits or power supplies enabled).

At 108, responsive to the input representative of authorized user verification and based at least in part on determining that the value of the input fails the satisfy the threshold, the method 100 can include capturing, at the mobile device via a sensor, environmental data associated with the mobile device and at 110, location data associated with a location of the mobile device. Unconfirmed authorized verification (e.g., an unsatisfied threshold value) can include an incorrect password or passcode, unconfirmed received biometric data, or other incorrect answers to a prompt. Unconfirmed authorized verification, in some instances, can include a non-response to the prompt within a threshold period of time. For instance, if the mobile device prompts a user to verify that he or she is authorized to use the device, but no response is received within five minutes (e.g., or other desired threshold time period set by the authorized user or an application manufacturer), a determination can be made that authorized verification is unconfirmed.

Environmental data can include, for instance, weather data of an environment of the mobile device, sound data of the environment of the mobile device, or image data such as an image of the unauthorized user and/or an image of the of the environment of the mobile device, among other environmental data. For instance, environmental data can be collected via a sensor such as the sensor device 102 can include a relative humidity (RH) sensor, a temperature sensor, a weight sensor, a light sensor, a pressure sensor, a chemical sensor, a biosensor, an image sensor (e.g., a camera), a speed sensor, a biometric sensor, a weather sensor, a pollution sensor, a lighting sensor, a security sensor, a gas sensor, or a combination thereof. Other sensor devices may also be present or coupled to the mobile device for capturing environmental data. Location data can include, for instance, GPS location data, Wi-Fi signal location data, mobile device tower data, Bluetooth data, or a combination thereof. In some examples, the environmental data and the location data may be captured without the unauthorized user's knowledge. For instance, photos of the unauthorized user or the environment may be taken covertly, and GPS or other location capabilities may be turned on without requesting permission from the unauthorized user. In some instances, some or all sensors may turn on automatically and capture data covertly responsive to unconfirmed authorized verification.

In some examples, based on the captured environmental data and the captured location data, the method 100 can include utilizing a machine learning model to determine the location of the mobile device. For instance, the mobile device or an application thereon, may include a machine learning algorithm that has been trained with environmental and location data. In addition, the mobile device may collect, using its sensors, environmental data and location data as the authorized user carries the mobile device, and the machine learning model (and an associated database) can be updated with that learned data. Using this trained and learned data, a determination can be made with respect to a location of the mobile device.

For instance, the mobile device may capture temperature data, image data, GPS data, and Wi-Fi signal data. The captured data can be compared to a database (e.g., stored with a cloud service, stored within a memory resource, etc.) created using the machine learning model, and a determination can be made that the mobile device is on the third floor of a particular building in a particular business. For instance, the temperature data may indicate an indoor location, the image data may indicate a particular logo, the GPS may give general coordinates or a physical address, and the Wi-Fi signal data may indicate the business or floor where the mobile device is receiving its wireless signal. In some instances, the location determination may be a suggestion or estimation, for instance if enough matches in the database cannot be made to determine an exact location.

The method 100, at 112, can include communicating the captured environmental data and location data to an authorized user of the mobile device. For instance, the location of the mobile device determined using the machine learning model can be communicated to the authorized user. The communication can include a text message to a list of authorized users, a notification to a different mobile device (e.g., a connected tablet, smartwatch, etc.), a notification to an email address of an authorized user, or an automated call to a secondary phone number of the authorized user, among other communication methods. In some examples, the mobile device can be disabled responsive to input representative of the authorized user verification and based at least in part on determining that the value of the input fails to satisfy the threshold. Put another way, the mobile device can be disabled responsive to unconfirmed authorized verification. In some examples, an authorized user can choose to disable the mobile device responsive to a communication regarding the unconfirmed authorized verification or a communication regarding the location of the mobile device. For instance, if the authorized user learns his or her mobile device is in his or her apartment building potentially in the laundry room, the authorized user may choose to go check if he or she left the mobile device there before disabling it. Disabled, for instance, can include locked, powered off, in power-preserve mode (e.g., energy efficient mode to preserve battery, appears powered off, etc.). In some examples, a disabled mobile device may continue to collect data undetected.

Figure 2:
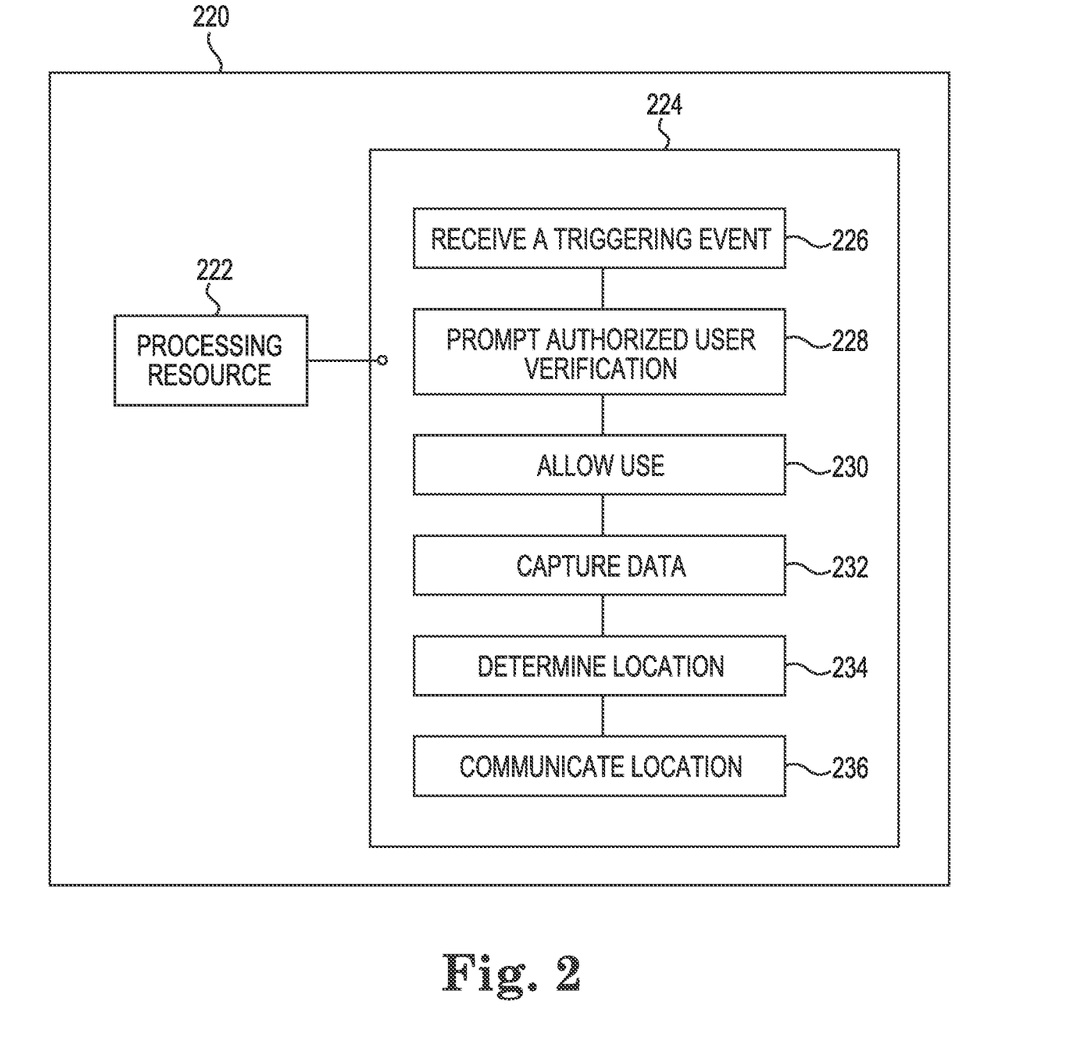
FIG. 2 is a diagram of an example apparatus having a processor and a memory resource with executable instructions thereon in accordance with a number of embodiments of the present disclosure.

FIG. 2 is a diagram of an example apparatus having a processing resource 222 and a memory resource 224 with executable instructions 226, 228, 230, 232, 234, 236 thereon in accordance with a number of embodiments of the present disclosure. The apparatus illustrated in FIG. 2 can be a mobile device 220 and can include the processing resource 222. The apparatus can further include the memory resource 224 (e.g., a non-transitory MRM), on which may be stored instructions, such as 226, 228, 230, 232, 234, 236. Although the following descriptions refer to a processing resource and a memory resource, the descriptions may also apply to a system with multiple processing resources and multiple memory resources. In such examples, the instructions may be distributed (e.g., stored) across multiple memory resources and the instructions may be distributed (e.g., executed by) across multiple processing resources.

The memory resource 224 may be electronic, magnetic, optical, or other physical storage device that stores executable instructions. Thus, the memory resource 224 may be, for example, non-volatile or volatile memory. For example, non-volatile memory can provide persistent data by retaining written data when not powered, and non-volatile memory types can include NAND flash memory, NOR flash memory, read only memory (ROM), Electrically Erasable Programmable ROM (EEPROM), Erasable Programmable ROM (EPROM), and Storage Class Memory (SCM) that can include resistance variable memory, such as phase change random access memory (PCRAM), three-dimensional cross-point memory, resistive random access memory (RRAM), ferroelectric random access memory (FeRAM), magnetoresistive random access memory (MRAM), and programmable conductive memory, among other types of memory. Volatile memory can require power to maintain its data and can include random-access memory (RAM), dynamic random-access memory (DRAM), and static random-access memory (SRAM), among others.

In some examples, the memory resource 224 is a non-transitory MRM comprising Random Access Memory (RAM), an Electrically-Erasable Programmable ROM (EEPROM), a storage drive, an optical disc, and the like. The memory resource 446 may be disposed within a controller and/or computing device. In this example, the executable instructions 226, 228, 230, 232, 234, 236 can be "installed" on the device. Additionally and/or alternatively, the memory resource 224 can be a portable, external or remote storage medium, for example, that allows the system to download the instructions 226, 228, 230, 232, 234, 236 from the portable/external/remote storage medium. In this situation, the executable instructions may be part of an "installation package". As described herein, the memory resource 224 can be encoded with executable instructions for determining a location of a mobile device 220.

The instructions 226, when executed by a processing resource such as the processing resource 222, can receive a triggering event indicating the mobile device 220 is in an unauthorized location, in possession of an unauthorized user, or both. For example, the triggering event may include a determination that the mobile device 220 is following an abnormal location pattern. Based on captured GPS and other location data, it may be determined that the mobile device 220 is traveling in a neighboring state, and a machine learning model can be used to determine this location data pattern is abnormal, as the mobile device 220 rarely travels out-of-state. Similar, the triggering event may include receipt of an unauthorized passcode or unauthorized biometric data. In some examples, the triggering event may be the authorized user requesting a mobile device location determination because the authorized user has lost, misplaced, or cannot find his or her mobile device.

The instructions 228, when executed by a processing resource such as the processing resource 222, can prompt, via a display of the mobile device 220, authorized user verification. A user may be prompted for a passcode, biometric data, or other identification information to verify her or she is an authorized user. The instructions 230, when executed by a processing resource such as the processing resource 222, can allow use of the mobile device 220 responsive to confirmed authorized verification. For instance, if the user supplies a correct passcode or authorized biometric data, use of the mobile device 220 may be allowed.

The instructions 232, when executed by a processing resource such as the processing resource 222, can capture, at the mobile device 220 via a sensor, image data, temperature data, sound data, or a combination thereof, associated with an environment of the mobile device 220 responsive to unconfirmed authorized verification. The instructions 232, when executed by a processing resource such as the processing resource 222, can also capture, at the mobile device 220, location data (e.g., GPS location data, Wi-Fi signal location data, mobile device tower data, Bluetooth data, or a combination thereof) associated with the mobile device 220 responsive to unconfirmed authorized verification.

For instance, if it is determined the user is not an authorized user, due to incorrect passcodes, unauthorized biometric data, etc. or non-responsiveness after a threshold period of time, a plurality of environmental data and location data. In a non-limiting example, an authorized user may misplace his or her smartphone. A triggering event, in this example, can include the smartphone detecting unauthorized biometric data (e.g., an unauthorized fingerprint) and a request from the authorized user (e.g., via a different mobile device or computing device) to determine a location of his or her smartphone.

The smartphone can respond by activating sensors including an image sensor, a temperature sensor, and a noise sensor, among others, to capture environment data. The image sensor may capture photos of a painting on a wall, and a person's face, while the temperature sensor captures a consistent 72-degree temperature, and the noise sensor captures classical music. The location data may include GPS data such as a physical address and Wi-Fi signal data.

The instructions 234, when executed by a processing resource such as the processing resource 222, can utilize a machine learning model to determine a location of the mobile device 220 based on the captured image data, temperature data, sound data, or a combination thereof and the captured location data. For example, the captured image data, temperature data, sound data, or a combination thereof and the captured location data can be compared to a database (e.g., stored in with a cloud service, stored in memory resource 224, etc.) of trained environmental and location data. In the previous non-limiting example, the machine learning model may take the captured environmental data and location data to determine the smartphone is in Office Building A, Floor B, Office C. For instance, the authorized user may have previously left his or her smartphone in a colleague's office, and the model used previous environmental data including the person's face and the painting to determine the probable location. Together with location data including the Wi-Fi signal data, the accuracy of the location data can be improved. In some examples, the machine learning model can be updated using the captured image data, temperature data, sound data, or a combination thereof and the location data.

The instructions 236, when executed by a processing resource such as the processing resource 222, can communicate the location of the mobile device 220 to the authorized user of the mobile device 220. For instance, the authorized user may receive an email indicating the location of the smartphone. While in some examples, the instructions can be executable to automatically disable the mobile device 220 responsive to unconfirmed authorized verification, in the previous non-limiting example, the instructions can be executable to request from the authorized user of the mobile device 220 an indication whether to disable the mobile device 220 responsive to unconfirmed authorized verification, disable the mobile device 220 responsive to receipt of an indication from the authorized user to disable the mobile device 220 or responsive to a lack of indication from the authorized user after a threshold period of time, and allow use of the mobile device 220 responsive to receipt of an indication from the authorized user to allow use of the mobile device 220. For instance, the authorized user may recognize the location and likely possessor of the smartphone and may choose not to disable it. In the same example, if the authorized user recognized the building and/or the office, but did not recognize the unauthorized user, the image of the user's face may be sent to security personnel of the building to confirm identity or alert them of a stolen mobile device.

As used herein, "automatically" can include an action performed with limited or no user input and/or with limited or no prompting. For instance, disabling the phone, if chosen as the desired action in a setting menu by the authorized user, can occur with limited or no user input responsive to unconfirmed authorized verification.

Figure 3:
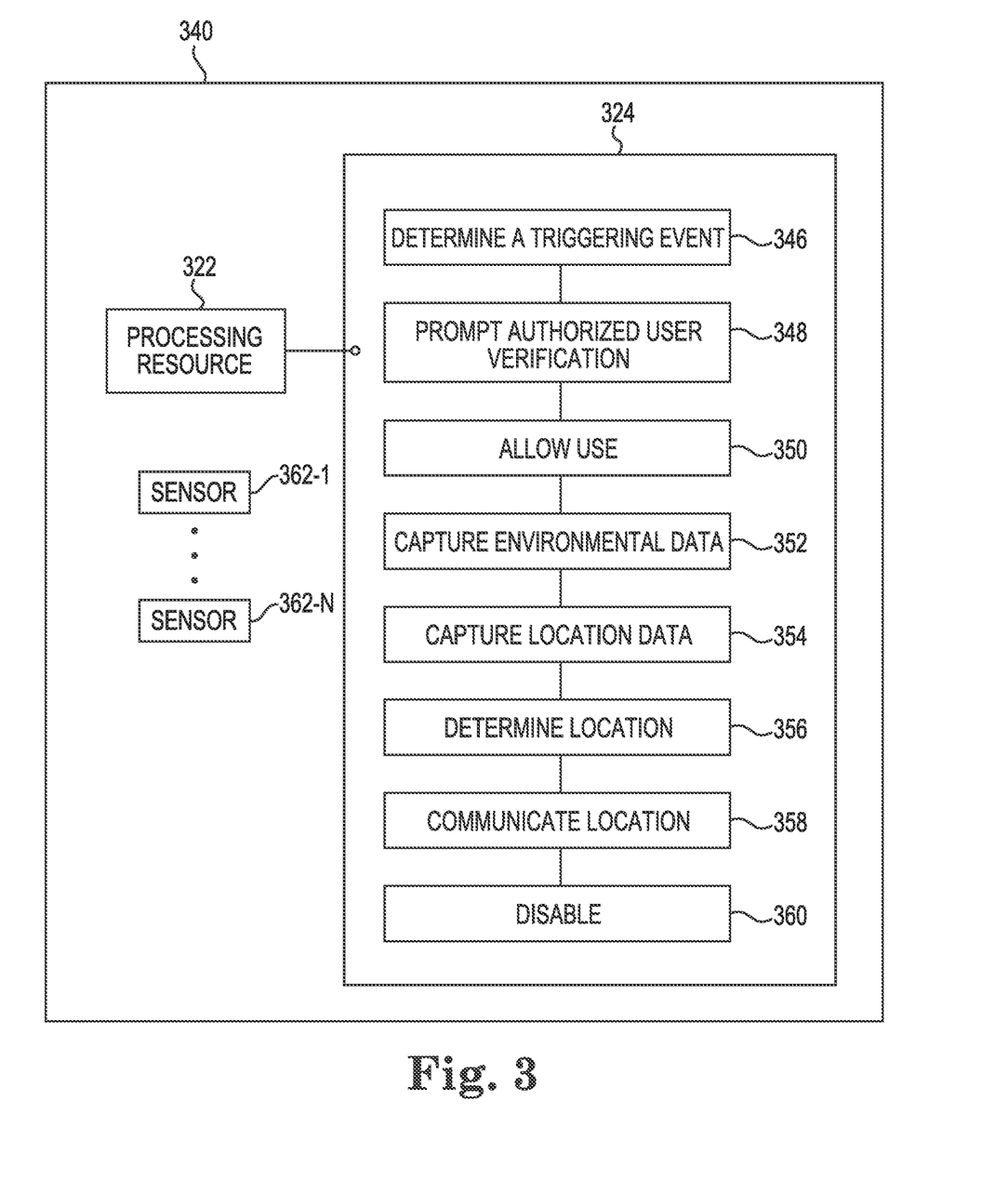
FIG. 3 is a diagram of an example apparatus having a processor, a memory resource, and a plurality of sensors thereon in accordance with a number of embodiments of the present disclosure.

FIG. 3 is a diagram of an example apparatus having a processing resource 322, a memory resource 324, and a plurality of sensors 362-1, . . . , 362-N thereon in accordance with a number of embodiments of the present disclosure. The apparatus illustrated in FIG. 2 can be a mobile device 340 and may be analogous to the apparatus (e.g., mobile device) 220 described with respect to FIG. 2. Similar, the processing resource 322 and the memory resource 324 may be analogous to the processing resource 222 and the memory resource 224, respectively, as described with respect to FIG. 2. The apparatus can include the memory resource 324 (e.g., a non-transitory MRM), on which may be stored instructions, such as 346, 348, 350, 352, 354, 356, 358, and 360.

The instructions 346, when executed by a processing resource such as the processing resource 322, can determine a triggering event indicating the mobile device 340 is in an unauthorized location, in possession of an unauthorized user, or both, has occurred utilizing a first machine learning model based on received biometric data, password data, location pattern data, or a combination thereof. For example, the received biometric data, password data, location pattern data, or a combination thereof can be compared to a database of trained identification and location data, and a non-match to authorized data or a match to previously learned unauthorized data may be a triggering event. In some examples, a determination that the triggering event has occurred can be made responsive to receipt of a request from the authorized user to determine a location of the mobile device. For instance, if the authorized user determines he or she has misplaced his or her tablet, he or she may request a location determination.

The instructions 348, when executed by a processing resource such as the processing resource 322, can prompt, via a display of the mobile device 340, authorized user verification, and the instructions 350, when executed by a processing resource such as the processing resource 322, can allow use of the mobile device 340 responsive to confirmed authorized verification within a threshold period of time. For instance, if an authorized user (e.g., the authorized user's spouse) accidentally took the authorized user's tablet to work, causing a triggering event (e.g., abnormal location data pattern), the spouse may enter a passcode when prompted, and the tablet may be accessed. In such an example, a communication (e.g., email, text message, etc.) may be sent to the authorized user indicating confirmed authorized user verification.

The instructions 352, when executed by a processing resource such as the processing resource 322, can capture, at the mobile device 340 via a first sensor 362-1 of the plurality of sensors 362, environmental data associated with the mobile device 340 responsive to unconfirmed authorized verification or non-response within the threshold period of time. For instance, if in the previous example, the tablet was stolen, and the thief either did not respond to the prompt or responded incorrectly, the first sensor 362-1 may be activated. In some examples, the plurality of sensors 362 may be activated.

The first sensor 362-1 may be an image sensor, for instance, and can capture photos of the environment of the mobile device 340 (e.g., vehicle, faces, signs, etc.) or the first sensor 362-1 may be an RH sensor, among others to capture data useful for making determinations about the environment in which the mobile device 340 is and/or the user (e.g., the thief) with the mobile device 340. In some examples, the captured environmental data includes captured image data, temperature data, sound data, or a combination thereof.

The instructions 354, when executed by a processing resource such as the processing resource 322, can capture, at the mobile device 340 via a second sensor 362-N of the plurality of sensors 362, location data associated with the mobile device 340 responsive to unconfirmed authorized verification or non-response within the threshold period of time. For instance, if in the previous example, the tablet was stolen, and the thief either did not respond to the prompt or responded incorrectly, the second sensor 362-N may be activated. In some examples, the plurality of sensors 362 may be activated.

The second sensor 362-N may be a GPS sensor, Wi-Fi signal sensor, or other location data sensor, among others, to capture location data (e.g., physical address, location of Wi-Fi network, etc.) associated with the mobile device 340 that may be useful for making determinations about the location in which the mobile device 340 is and/or the user (e.g., the thief) with the mobile device 340.

In some examples, the environmental data and the location data can be captured covertly. For instance, the sensors 362 can be activated (e.g., turned on) without indicating the activation to the unauthorized user. In the previous example, a front camera of the tablet may capture photos of the thief without sound or flash, while the rear camera captures photos of the surroundings. The GPS of the device may be activated without prompting the unauthorized user for permission. Other sensors may be activated in similar manners.

The instructions 356, when executed by a processing resource such as the processing resource 322, can utilize a second machine learning model to determine a location of the mobile device 340 based on the captured environmental data and the captured location data. For example, captured image data, temperature data, sound data, other environmental data, or a combination thereof and the captured location data can be compared to a database of trained environmental and location data. In the thief example, the environmental data may include photos of a hotel logo, high RH levels and temperature levels, and photos of a car. The location data may include GPS data including a physical address, and Wi-Fi data include a particular wireless network. This data can be compared to the database, and a determination may be made that the tablet is located in a hot and humid location at a particular hotel with the physical address and connected to the particular wireless network. The wireless network may allow for narrowing of location of the tablet, and the car may be used for identification purposes.

The instructions 358, when executed by a processing resource such as the processing resource 322, can communicate the location of the mobile device 340 to the authorized user of the mobile device 340. In some examples, the environmental and location data captured by the sensors 362 can be communicated to the authorized user. In the thief example, the data can be communicated to law enforcement or the hotel.

The instructions 360, when executed by a processing resource such as the processing resource 322, can disable the mobile device 340. For instance, once a determination is made that the user is unauthorized, the mobile device 340 may be disabled. In some examples, the sensors 362 may be activated (e.g., covertly) even if the mobile device 340 is disabled.

Figure 4:
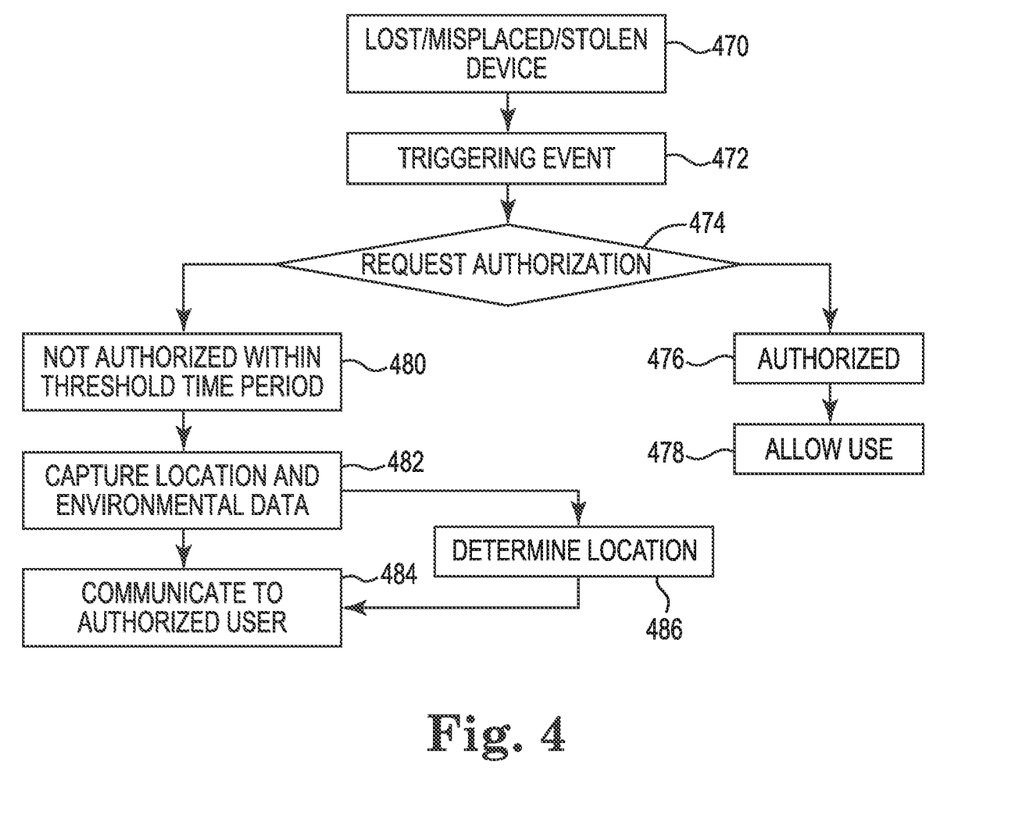
FIG. 4 is another flow diagram representing an example method for determining a location of a mobile device in accordance with a number of embodiments of the present disclosure.

FIG. 4 is another flow diagram representing an example method for determining a location of a mobile device in accordance with a number of embodiments of the present disclosure. At 470, a determination is made that a mobile device has been lost, misplaced, stolen, etc. This determination can come from a triggering event. For instance, a triggering event may occur at 472 when a communication (e.g., via an application on a different mobile device, via a provider's website, etc.) is received from an authorized user that his or her phone is missing, when unauthorized data (e.g., biometric, password/passcode, location data pattern) is received, or a combination thereof.

At 474, authorization of the user of the mobile device is requested. For instance, upon receipt of a triggering event, the user of the mobile device may be prompted to provide biometric data or a passcode. If, at 476, it is determined the user is authorized because a correct authentication was provided, the user is allowed use of the mobile device at 478.

If, at 480, it is determined that the user is unauthorized, either due to incorrect biometric, password, or other authorization data or because the user did not respond to the authorization prompt within a threshold period of time, location and environmental data associated with the mobile device can be captured at 482. For instance, using sensors of the mobile device, data that may be helpful in determining the location of the mobile device may be capture (e.g., image data of the unauthorized user, images of a vehicle, GPS data, Wi-Fi data, temperature data, etc.). At 484, this location and environmental data can be provided to the authorized user.

At 486, a location of the mobile phone may be determined using a machine learning model. For instance, based on the captured environmental and location data, the machine learning model can make comparisons to a database and estimate the location of the mobile device. For instance, the machine learning model can use data with which it was previously trained, along with any updates to location and environmental data, along with any hardware changes, to estimate the location of the mobile device. For instance, the machine learning model may have data associated with certain Wi-Fi networks, GPS locations, image data, etc. that can be used to make the location determination. The location determination can be communicated to the authorized user at 484. In some examples the location determination may be an estimate based on the data available to the machine learning model. For instance, if matches were not available for all the captured data, an estimate of the location may be provided.

In a non-limiting example, an authorized user misplaces his or her smartwatch at box 470. The triggering event at box 472 includes the authorized user requesting a location determination of the smartwatch. At 474, the smartwatch prompts, via its display, a passcode. At 480, authorization is not received within a threshold time period, so a determination is made that the smartwatch is in an unauthorized location, with an unauthorized user, or both. At 482, sensors of the smartwatch capture environmental data (e.g., photos, temperature data, etc.) and location data (e.g., GPS data, Wi-Fi data), and at 484 that environmental and location data is communicated to the authorized user.

At 486, using the captured location and environmental data, a machine learning model is used to determine a location of the smartwatch. For instance, the captured data may include an image of trash, a temperature of 72 degrees, a physical address of the authorized user's office building, and a Wi-Fi signal associated with a conference room on a particular floor of the authorized user's office building. The machine learning model may compare this captured location and environmental data to determine the smartwatch is in a trashcan of the conference room. This determined location can be communicated to the authorized user at 484.

Although specific embodiments have been illustrated and described herein, those of ordinary skill in the art will appreciate that an arrangement calculated to achieve the same results can be substituted for the specific embodiments shown. This disclosure is intended to cover adaptations or variations of one or more embodiments of the present disclosure. It is to be understood that the above description has been made in an illustrative fashion, and not a restrictive one. Combination of the above embodiments, and other embodiments not specifically described herein will be apparent to those of skill in the art upon reviewing the above description. The scope of the one or more embodiments of the present disclosure includes other applications in which the above structures and processes are used. Therefore, the scope of one or more embodiments of the present disclosure should be determined with reference to the appended claims, along with the full range of equivalents to which such claims are entitled.

In the foregoing Detailed Description, some features are grouped together in a single embodiment for the purpose of streamlining the disclosure. This method of disclosure is not to be interpreted as reflecting an intention that the disclosed embodiments of the present disclosure have to use more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

What is claimed is:

1. A method, comprising:
    determining, using a machine learning model of a mobile device, a location pattern of the mobile device based on data collected during an authorized user's daily routine;
    receiving, at the mobile device, in response to a first triggering event, signaling that indicates the mobile device is in an unauthorized location, in possession of an unauthorized user, or both;
    receiving, at the mobile device, in response to a second triggering event, signaling that indicates the mobile device experienced an abnormal location pattern that differs from the determined location pattern;
    prompting, in response to receipt of the first and the second triggering events and via a display of the mobile device, an input representative of authorized user verification;
    responsive to the input representative of the authorized user verification, enabling one or more circuits or power supplies of the mobile device based at least in part on determining that a value of the input satisfies a threshold; or
    responsive to the input representative of the authorized user verification and based at least in part on determining that the value of the input fails to satisfy the threshold:
        capturing, at the mobile device via a sensor, environmental data associated with the mobile device;
        capturing, at the mobile device, location data associated with a location of the mobile device; and
        communicating the captured environmental data and location data to the authorized user of the mobile device.

2. The method of claim 1, further comprising disabling the mobile device responsive to the input representative of the authorized user verification and based at least in part on determining that the value of the input fails to satisfy the threshold.

3. The method of claim 1, further comprising the mobile device:
    utilizing the machine learning model to determine the location of the mobile device based on the captured environmental data and the captured location data; and
    communicating the determined location of the mobile device to the authorized user of the mobile device.

4. The method of claim 1, wherein receiving the signaling in response to the first triggering event comprises receiving signaling representative of unauthorized biometric data, unauthorized password data, or a combination thereof.

5. The method of claim 1, wherein receiving the signaling in response to the first triggering event comprises remotely receiving signaling representative of a notification from an authorized user that the mobile device is in the unauthorized location, in possession of the unauthorized user, or both.

6. The method of claim 1, wherein capturing the environmental data comprises capturing weather data of an environment of the mobile device.

7. The method of claim 1, wherein capturing the environmental data comprises capturing sound data of an environment of the mobile device.

8. The method of claim 1, wherein capturing the environmental data comprises capturing an image of the unauthorized user, an image of the environment of the mobile device, or both.

9. The method of claim 1, wherein capturing the location data comprises capturing global positioning system (GPS) location data, Wi-Fi signal location data, mobile device tower data, Bluetooth data, or a combination thereof.

10. A mobile device, comprising:
    a processing resource; and
    a memory resource in communication with the processing resource and having instructions executable to:
        determine, using a machine learning model of the mobile device, a location pattern of the mobile device based on data collected during an authorized user's daily routine;
        receive a first triggering event indicating the mobile device is in an unauthorized location, in possession of an unauthorized user, or both;
        receive a second triggering event, indicating the mobile device experienced an abnormal location pattern that differs from the determined location pattern;
        prompt, in response to receipt of the first triggering event and the second triggering event and via a display of the mobile device, authorized user verification;
        responsive to confirmed authorized verification, allow use of the mobile device;
        responsive to unconfirmed authorized verification:
            capture, at the mobile device via a sensor, image data, temperature data, sound data, or a combination thereof, associated with an environment of the mobile device;
            capture, at the mobile device, location data associated with the mobile device;
            utilize the machine learning model to determine a location of the mobile device based on the captured image data, temperature data, sound data, or a combination thereof and the captured location data; and
            communicate the location of the mobile device to the authorized user of the mobile device.

11. The mobile device of claim 10, further comprising the instructions executable to update the machine learning model using the captured image data, temperature data, sound data, or a combination thereof and the location data.

12. The mobile device of claim 10, further comprising the instructions executable to automatically disable the mobile device responsive to unconfirmed authorized verification.

13. The mobile device of claim 10, wherein the location data comprises global positioning system (GPS) location data, Wi-Fi signal location data, mobile device tower data, Bluetooth data, or a combination thereof.

14. The mobile device of claim 10, further comprising the instructions executable to:
    request from the authorized user of the mobile device an indication whether to disable the mobile device responsive to unconfirmed authorized verification;
    disable the mobile device responsive to receipt of an indication from the authorized user to disable the mobile device or responsive to a lack of indication from the authorized user after a threshold period of time; and
    allow use of the mobile device responsive to receipt of an indication from the authorized user to allow use of the mobile device.

15. The mobile device of claim 10, wherein the instructions executable to utilize the machine learning model to determine the location of the mobile device further comprise instructions executable to compare the captured image data, temperature data, sound data, or a combination thereof and the captured location data to a database of trained environmental and location data.

16. A mobile device, comprising:
a plurality of sensors;
a processing resource communicatively coupled to the plurality of sensors; and
a memory resource in communication with the processing resource and having instructions executable to:
  determine, using a machine learning model of the mobile device, a location pattern of the mobile device based on data collected during an authorized user's daily routine;
  determine a first triggering event indicating the mobile device is in an unauthorized location, in possession of an unauthorized user, or both, has occurred utilizing a first machine learning model based on received biometric data, password data, or a combination thereof;
  determine a second triggering event, indicating the mobile device experienced an abnormal location pattern that differs from the determined location pattern;
  prompt, in response to receipt of the first triggering event and the second triggering event and via a display of the mobile device, authorized user verification;
  responsive to confirmed authorized verification within a threshold period of time, allow use of the mobile device;
  responsive to unconfirmed authorized verification or non-response within the threshold period of time:
    capture, at the mobile device via a first sensor of the plurality of sensors, environmental data associated with the mobile device;
    capture, at the mobile device via a second sensor of the plurality of sensors, location data associated with the mobile device;
    utilize a second machine learning model to determine a location of the mobile device based on the captured environmental data and the captured location data;
    communicate the location of the mobile device to the authorized user of the mobile device; and
    disable the mobile device.

17. The mobile device of claim 16, further comprising the instructions executable to covertly capture the environmental data and the location data.

18. The mobile device of claim 16, further comprising the instructions executable to determine the first triggering event has occurred responsive to receipt of a request from the authorized user to determine a location of the mobile device.

19. The mobile device of claim 16, wherein the instructions executable to utilize the first machine learning model to determine the triggering event has occurred further comprise instructions executable to compare the received biometric data, password data, or a combination thereof to a database of trained identification and location data.

20. The mobile device of claim 16, wherein the instructions executable to utilize the second machine learning model to determine the location of the mobile device further comprise instructions executable to compare captured image data, temperature data, sound data, or a combination thereof and the captured location data to a database of trained environmental and location data.

* * * * *